Patented Apr. 4, 1950

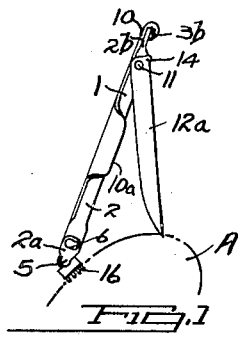

2,502,801

UNITED STATES PATENT OFFICE 2,502,801

HEADREST FOR AUTOMOBILE SEATS

Lawrence Schott, Detroit, Mich.

Application November 8, 1947, Serial No. 784,878

5 Claims. (Cl. 155—174)

This invention relates to improvements in head rests, and refers to head rests primarily intended for use in automobiles.

This invention aims to provide, among other things, a head rest: which can be easily secured to, or removed from, the back of an automobile seat; which is collapsible and can be folded to occupy a very small amount of room so that it may be stored in a glove compartment when not in use; and which is cheap and simple to manufacture, and comfortable to use.

Having thus briefly stated some of the objects and advantages of the invention I will now describe it in detail with the aid of the accompanying drawing, in which:

Figure 1 is a side view of the invention mounted upon the back of an automobile seat, and Figure 2 is a similar view showing the head rest slightly higher upon the back so that it is inclined at a greater angle to the vertical.

Figure 3 is an enlarged rear view showing the head rest open and ready for use, and Figure 4 is a side view thereof.

Figure 5 shows the head rest partly collapsed, and

Figure 6 shows it fully collapsed.

Referring to the drawing, 1 designates a frame which is substantially rectangular when open, and consists of four members 2, 3, 4 and 5, of substantially uniform length which are pivoted to one another. The adjacent ends 2a and 5a of the members 2 and 5 respectively are offset so that they lie parallel and adjacent one another in overlapping relation. Through these overlapping ends 2a and 5a a pin 6 extends the axis of which passes diagonally across the frame when the latter is open, as can be seen from Figure 3. The adjacent ends 3a and 4a of the members 3 and 4 respectively are similarly offset and pivoted to one another by a pin 7 the axis of which is in alignment with the axis of the pin 6, so that the frame may be folded about the common axis of the two said pins and the members 2 and 3 brought substantially into contact with the members 5 and 4 respectively throughout their length, thereby folding the frame so that it assumes a triangular form.

The adjacent extremities 2b and 3b of the members 2 and 3 respectively are pivoted to one another by a pin 8 which lies transversely of the frame, and the adjacent ends 4b and 5b of the members 4 and 5 respectively are pivoted to one another by a pin 9 extending parallel to the pin 8 and positioned diagonally opposite the latter when the frame is open. Thus when the frame 1 has been folded into its triangular form as above described the pins 8 and 9 are almost coaxial, and their arrangement permits inward movement of the members 5 and 2 about the pins 9 and 8 into close proximity to the members 4 and 3 respectively. 10 denotes a piece of flexible material, such as fabric, which is placed diagonally upon the frame 1 with its corners projecting beyond the members 2, 3, 4 and 5 substantially centrally of the length of the latter. Each corner piece 10a of the material 10 is folded back around the outer side of each of the said members and is suitably secured, as by an adhesive or by sewing, to the central portion of the said flexible material to hold the latter taut upon the frame when the latter is fully open.

Pivotally mounted on the members 2 and 4 adjacent the member 3 upon aligned hinge pins 11 are arms 12, which, in the present instance, are shown of channel section so that opposite sides of the channels lie substantially contiguous to opposite sides of the members on which they are mounted when the said arms and members are parallel. To retain the arms in that position and prevent their accidental movement projections 13 may be formed upon them adjacent their pivoted extremities. These projections are sufficiently resilient to permit the arms to be swung at an inclination to the members on which they are mounted upon the application of pressure, so that they may assume the position shown at 12a. Formed also on the arms 12 at their pivoted ends are stops 14 to limit their outward pivotal movement. Formed across the outer extremities of the arms 12 are serrations to grip the back A of the seat which they engage.

Welded or otherwise secured to the member 4 toward opposite extremities thereof are feet 15 each having a plurality of inclined spikes 16 projecting therefrom to engage the back A of the seat. The spikes on one foot are inclined toward those on the other foot so that if the member 4 is pulled toward the opposite side after engagement of the spikes on one foot with the material on the back A, and the spikes 16 on the other foot are then engaged with the material so that the latter extends relatively loosely between the two feet 15, accidental disengagement of the spikes will not occur.

From the foregoing it will be seen that I have devised a simple and comfortable form of collapsible head rest which remains secured in position when in use, and which can be readily removed and folded into quite a small compass for storage in a glove compartment when it is not required.

What I claim is:

1. A head rest comprising a rectangular frame including four frame members, a pivot pin connecting the adjacent extremities of each pair of members, one pair of pivot pins being in axial alignment diagonally across the frame, and the other pair of pivot pins being parallel to one another and extending transversely of the frame whereby said frame may be collapsed when not in use, a piece of flexible material normally held taut by and secured to said members, means on the frame for engaging the back of a seat, and arms mounted on the frame and spaced from the engaging means adapted to rest upon the back of the seat and support the frame in an inclined position.

2. A head rest comprising a rectangular frame including four frame members, a pivot pin connecting the adjacent extremities of each pair of members, one pair of pivot pins being in axial alignment diagonally across the frame and the other pair of pivot pins being parallel with one another and extending transversely of the frame whereby said frame may be collapsed when not in use, a piece of flexible material normally held taut by and secured to all said members, one frame member having spaced feet thereon to engage the back of a seat, an arm pivoted on each frame member normally extending at right angles from said one frame member, and means on each arm for engaging the back of the seat and supporting the frame in a substantially upright position.

3. A head rest comprising a rectangular frame including four frame members, a pivot pin connecting the adjacent extremities of each pair of members, one pair of said pivot pins being in axial alignment diagonally across the frame, and the other pair of pivot pins being parallel and extending transversely of the frame whereby the latter may be collapsed when not in use, a piece of flexible material secured to all of the members and normally held taut in the frame, spaced feet on one of said members, spikes extending from each foot inclined toward the spikes on the other foot to engage the back of a seat, an arm pivoted on each frame member normally extending at right angles from said one frame member, and means on the outer extremities of the arms for engaging the back of the seat and supporting the frame substantially upright thereon.

4. A head rest comprising a rectangular frame including four frame members, a piece of flexible material secured to said members and held taut in said frame, a pivot pin connecting the adjacent extremities of each pair of members, the axes of two of said pivot pins being in alignment diagonally across the frame and the other two pivot pins being parallel and extending transversely of the frame whereby the latter may be folded so that the members lie substantially parallel and continuous to one another, spaced feet on one frame member, means on said feet for engaging the back of a seat, arms pivoted on each member normally extending at right angles from said one frame member, said arms being adapted to lie parallel and adjacent the members on which they are pivoted when not in use, means on the outer extremities of said arms adapted to engage the back of the seat and hold the frame substantially upright, and means limiting the pivotal movement of the arms relative to the frame members on which they are mounted.

5. A head rest comprising a rectangular frame including four frame members, a pivot pin connecting the adjacent extremities of each pair of members, one pair of pivot pins being in axial alignment diagronally across the frame, and the other pair of pivot pins being parallel to one another and extending transversely of the frame whereby said frame may be collapsed when not in use, a piece of flexible material normally held taut by and secured to said members, and means for supporting the frame upon the back of a seat.

LAWRENCE SCHOTT.

REFERENCES CITED

The following references are of record in the file of this patent:

UNITED STATES PATENTS

| Number | Name | Date |
|---|---|---|
| 1,647,934 | Sallop | Nov. 1, 1927 |
| 2,001,396 | Pumphrey | May 14, 1935 |
| 2,240,208 | Cross | Apr. 29, 1941 |
| 2,460,942 | Marshall | Feb. 8, 1949 |